US010361864B2

(12) United States Patent
Glendinning (10) Patent No.: US 10,361,864 B2
(45) Date of Patent: Jul. 23, 2019

(54) ENABLING A SECURE OEM PLATFORM FEATURE IN A COMPUTING ENVIRONMENT

(75) Inventor: Duncan Glendinning, Chandler, AZ (US)

(73) Assignee: INTEL CORPORATION, Santa Clara, CA (US)

(*) Notice: Subject to any disclaimer, the term of this patent is extended or adjusted under 35 U.S.C. 154(b) by 2023 days.

(21) Appl. No.: 11/864,954

(22) Filed: Sep. 29, 2007

(65) Prior Publication Data

US 2009/0086980 A1 Apr. 2, 2009

(51) Int. Cl.
*H04L 9/32* (2006.01)
*H04L 9/08* (2006.01)

(52) U.S. Cl.
CPC .......... *H04L 9/3234* (2013.01); *H04L 9/0838* (2013.01); *H04L 9/3263* (2013.01); *H04L 2209/80* (2013.01)

(58) Field of Classification Search
CPC .................................................... H04L 9/3234
USPC .......................................................... 705/59
See application file for complete search history.

(56) References Cited

U.S. PATENT DOCUMENTS

| | | | | |
|---|---|---|---|---|
| 5,892,900 A | * | 4/1999 | Ginter et al. | 726/26 |
| 6,061,788 A | * | 5/2000 | Reynaud | G06F 9/4406 |
| | | | | 713/100 |
| 6,915,278 B1 | * | 7/2005 | Ferrante | G06F 21/105 |
| | | | | 380/201 |
| 6,976,163 B1 | * | 12/2005 | Hind | G06F 21/572 |
| | | | | 713/1 |
| 2002/0112171 A1 | * | 8/2002 | Ginter | G06F 21/10 |
| | | | | 713/185 |
| 2007/0106985 A1 | * | 5/2007 | Pan | G06F 8/61 |
| | | | | 717/174 |
| 2008/0005032 A1 | * | 1/2008 | Znidarsic | G06F 21/105 |
| | | | | 705/59 |
| 2009/0086980 A1 | * | 4/2009 | Glendinning | H04L 9/0838 |
| | | | | 380/282 |

* cited by examiner

*Primary Examiner* — Jay Huang (57) ABSTRACT

A platform feature licensing module (e.g., a USB Smart Card Token) securely stores and communicates a platform feature enabling license, corresponding to a selectable platform feature, to an authenticated platform. The module includes a secure microcontroller, a secure communication port, and secure non-volatile memory in which is stored the platform feature enabling license. The module is configured to securely communicate with, and to authenticate the identity of the platform, via an integrated embedded controller embedded into the platform. The integrated embedded controller enables the selectable platform feature in response to a platform feature enabling license received from the platform feature licensing module. The integrated embedded controller and platform feature licensing module communicate securely using a predetermined public-key cryptography technique, with each having a PKI-based key pair to provide authentication and cryptographic services.

15 Claims, 3 Drawing Sheets

ENABLING A SECURE OEM PLATFORM FEATURE IN A COMPUTING ENVIRONMENT

BACKGROUND

An original equipment manufacturer (OEM) may enhance functionality of an unfinished platform, for example, by adding hardware, firmware, software, or some combination of these elements to realize desired platform functionality. A chipset may be assembled into the unfinished platform that is capable of controlling a platform feature which, when enabled, can facilitate the desired platform functionality. For example, an OEM may choose to enable a platform feature that provides platform resources to support an integrated communication, media, storage, display, or human-computer interface hardware element device. In another example, an OEM may choose to enable a platform feature that provides pre-activation of platform operating system or user application software.

An OEM may integrate into a platform a specialized application programming interface (API), third-party software, or a hardware or software plug-in, which may benefit from platform resources made available by enabling one or more platform features. Typically, as more platform features are enabled on an unfinished platform, the perceived value of finished platform increases, along with the unit price charged by an OEM. Frequently, platform features that provide or facilitate enhanced platform functionality result from significant R&D efforts by a manufacturer of a platform or a chipset.

Often, a manufacturer and an OEM enter into a licensing agreement, in which the OEM pays to the manufacturer a royalty or licensing fee in exchange for receiving a limited right to enable defined platform features on a number of platforms. The OEM typically bears the responsibility for tracking licensed implementations, and providing timely payment to the manufacturer, so that an OEM may host one or more license databases or provisioning servers in association with each production line. Such platform feature license provisioning and tracking servers can be expensive and may require dedicated personnel to maintain and update.

Moreover, the provisioning servers can be susceptible to attack, subversion, or manipulation, leading to unauthorized, unlicensed use of certain platform features, resulting in lost royalties to a manufacturer and, perhaps, in disruption of OEM production operations. In addition, a large OEM operation may experience loss and waste. Thus, an OEM may prefer to use a modular royalty schedule, based on features.

In an effort to keep finished platforms competitively priced, an OEM also may opt to pay platform feature licensing fee on a per-use or limited volume basis, rather than obtain a site license for each potential platform feature. However, in view of the vast array of potential platform features represented by per-use or limited volume licensing fees, an OEM may be required to obtain additional database or provisioning servers and, perhaps, to add an administrative layer to manage the more complex arrangement.

Understandably, an OEM may wish to avoid costs associated with such production support hardware, software, and personnel. In addition, an OEM may wish to limit or deter miscreants from purloining or misusing OEM licensing information from licensing database or security servers on the OEM production line.

BRIEF DESCRIPTION OF THE DRAWINGS

Features, elements, and aspects of the present invention that are referenced by the same numerals in different figures represent the same, equivalent, or similar features, elements, or aspects, in accordance with one or more embodiments.

DESCRIPTION OF EMBODIMENTS

Figure 1:
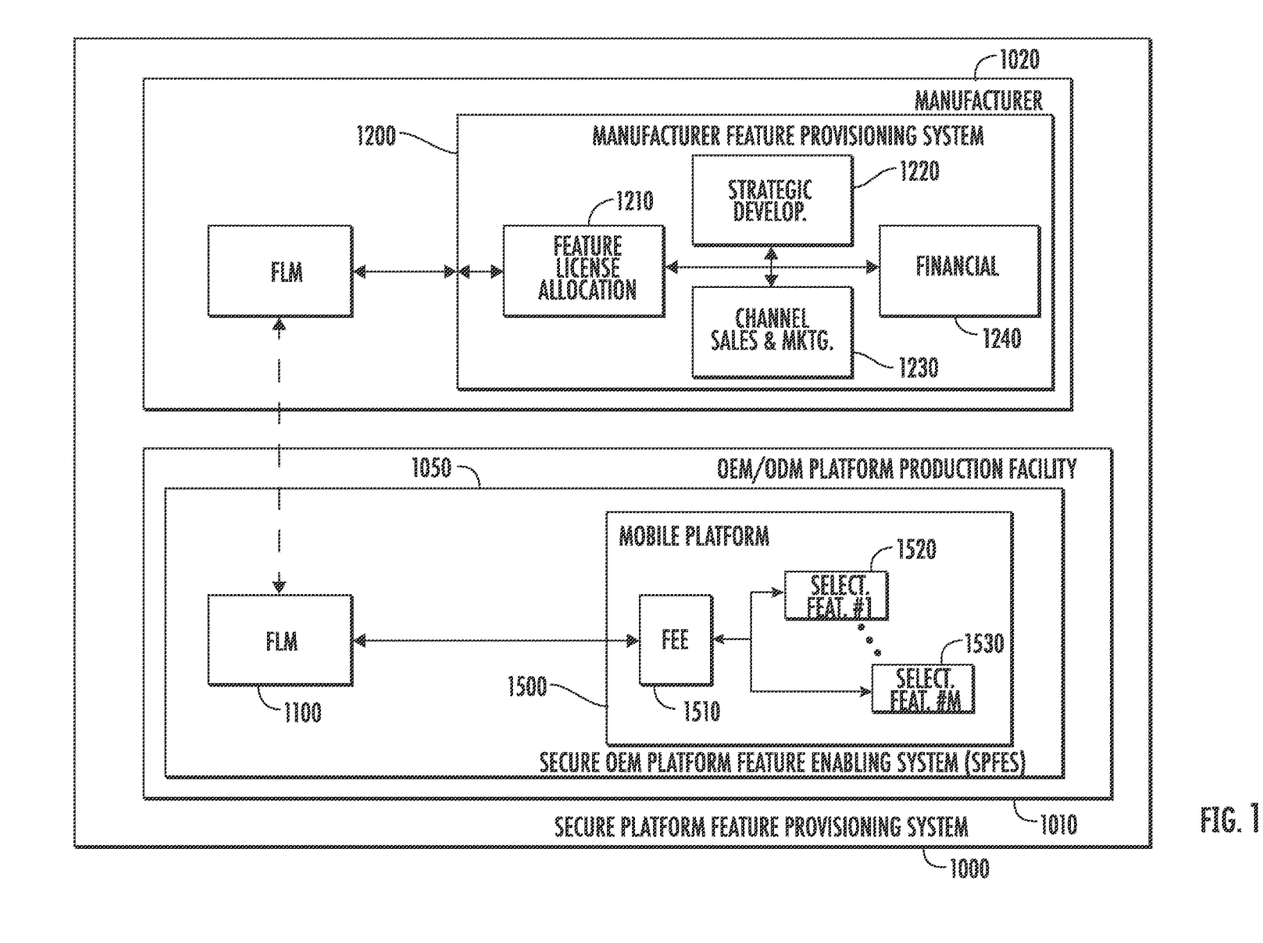
FIG. 1 is a block diagram illustrating a secure OEM platform feature enabling system, in accordance with one embodiment.

FIG. 1 illustrates an embodiment of secure platform feature provisioning system (SFPS) 1000, in which platform manufacturer (MFG) 1020 provides OEM 1010 with platform feature licensing module (FLM) 1100, which may permit OEM 1010 to meet a functional condition for a finished platform by modifying functionality of an unfinished platform, for example, as may be requested by an OEM platform customer. As used herein, the term "OEM" can be representative of an original equipment manufacturer (OEM), an original design manufacturer (ODM), a contract manufacturer, a value-added reseller (VAR), or other authorized provider of a finished platform.

A platform chipset may be assembled into an unfinished platform 1500, offering a rich set of latent selectable platform features, which may be at least partially controlled by selectable platform feature enabling element (FEE) 1510. OEM 1010 may selectively enable FEE 1510 during production to provide a desired functionality in finished platform 1500. Although not a requirement, MFG 1020 may supply OEM 1010 with an unfinished platform 1500 that is assembled with a chipset having FEE 1510 integrated therein. Alternatively, MFG 1020 may supply OEM 1010 with one or more chipsets having a respective integrated FEE 1510, which OEM 1010, in turn, may assemble into an unfinished platform 1500.

In accordance with one embodiment, platform 1500 comprises any system (e.g., a motherboard) having assembled thereon one or more logic or computing devices (e.g., a processor, embedded controller, or other functional logic element) including feature-enabling element (FEE) 1510. Platform 1500 can be emblematic of a computer platform including, without limitation, a server, a workstation, a desktop PC, a mobile PC, such as a laptop, a notebook, a tablet PC, a pocket PC, or a mobile wireless handset, a consumer electronic device, a networking or data communications device, a single board computer, a point-of-sale terminal, kiosk, a thin client, an industrial automation device, or another embedded device having a functional feature, which may be implemented in hardware, firmware, or software, and which is capable of being enabled using FLM 1100.

As used herein, the term unfinished relative to platform 1500 can refer a platform that may have at least one of selectable platform feature 1520, 1530, which has not been enabled by OEM 1010; and the term finished relative to platform 1500 can refer to a platform for which OEM 1010 may have enabled at least one of selectable platform feature 1520, or 1530, prior to shipping to a customer.

FEE 1510 can be an integrated embedded controller (IEC), that is, an embedded controller configured to provide platform 1500 with one or more of configuration, provisioning, access control, or system management services. FEE 1510 may be embodied in hardware, in firmware, in software, or in a cooperative combination thereof, and may be implemented as a physical element, for example, as a dedicated microcontroller, or as a logical element functionally distributed over more than one physical logic element. Platform 1500 may include more than one FEE 1510; and each FEE 1510 may be respectively capable of enabling more than one platform feature, for example, selectable platform feature #1 1520 and selectable platform feature #M 1530.

In one embodiment, during production, OEM 1010 may assemble one or more platform chipset into platform 1500, which also may be at least partially controlled by FEE 1510. Also, OEM 1010 may assemble one or more FEE 1510 into platform 1500, prior to shipping platform 1500 as a finished platform to a customer. OEM 1010 may be capable of receiving more than one type of platform 1500, each having embedded therein one or more of FEE 1510.

MFG 1020 may direct OEM 1010 to obtain a license as a condition for enabling one or more selectable platform features. MFG 1020 may employ manufacturer feature provisioning system 1200 to determine one or more of a license type, scope, or quantity, in response to a license request by OEM 1010. For example, licensing decisions may be made cooperatively by subsystems 1220, 1230, and 1240, with licenses being allocated to OEM 1010 by feature license allocation subsystem 1210. Licensing decisions can be a mechanism of system 1200 that assists MFG 1020 in recouping value realized by sale of the finished platform, in enforcing related intellectual property protection policies, in monitoring marketplace response to a finished platform, which bears a particular selectable platform feature, and in planning for future product research, development and availability.

As used herein, the term "platform feature enabling license" (PFEL) pertains to a license associated with enabling a selectable platform feature. In one embodiment, a finished platform may include one or more platform feature enabling elements, such as FEE 1510, with each controlling one or more selectable platform features. Such selectable platform feature may be enabled individually, or as a predetermined selectable platform feature set, in order to provide a predetermined finished platform functionality. In certain embodiments, it may be desirable to issue a PFEL to a respective FEE 1510 for each selectable platform feature thus enabled. In certain embodiments, it may be desirable to issue a PFEL to enable a predetermined selectable platform feature set. Selectable platform features, as well as predetermined selectable platform feature sets, may be adapted to suit the desired functionality for a selected target platform.

Platform feature licensing module (FLM) 1100 can be a compact, portable device, which may receive from feature license allocation subsystem 1210, a predetermined number of platform feature enabling licenses (PFEL) to be allocated to OEM 1010. FLM 1100 may be in a form that is convenient and simple to use by OEM personnel, yet is capable of securely controlling platform feature enablement. OEM 1010 may employ FLM 1100 in substitution for expensive, bulky, and generally stationary, license provisioning and tracking servers, which may be situated in proximity to an OEM production line. Together, FLM 1100 and platform 1500 can represent secure OEM platform feature enabling system (SPFES) 1050, which can configure OEM production line for configuring platform features and providing feature licensing capabilities, without the expense, overhead, or inconvenience of hosted OEM servers.

FLM 1100 may be a hand held device, configured to communicate securely with FEE 1510, for example, by establishing a secure communication channel therebetween, by exchanging messages using, for example, a public-key encryption protocol, or both. FLM 1100 may be coupled to platform 1500, for example, by a plug-in contact or by a wireless proximity communication technique. FLM 1100 can be configured to issue to FEE 1510, a PFEL, or a representation thereof, using a secure communication protocol, a secure communication channel, or both. In response to a received PFEL, FEE 1510 can enable a selectable platform feature or, alternatively, a predetermined selectable platform feature set, corresponding to the respective PFEL.

The predetermined number of PFEL allocated in FLM 1100 may be provided in accordance with a predetermined PFEL model. Two examples of a predetermined PFEL model include a pre-pay PFEL model and a post-pay PFEL model. In general, OEM 1010 cooperates with feature provisioning system 1200 of MFG 1020 to procure a predetermined number of platform feature enabling licenses. In a pre-pay PFEL model, an OEM may purchase a predetermined number of PFEL in advance of platform production, with one PFEL being exhausted when OEM 1010 enables a corresponding selectable platform feature in a particular one of platform 1500. In a post-pay PFEL model, OEM 1010 may make payment after one or more platforms 1500 have had selectable platform features enabled, having the number of enabled platforms being constrained to the predetermined number of PFEL. In either case, FLM 1100 may be capable of being renewed, or reconfigured, to permit additional licensing activity by OEM 1010

Figure 2:
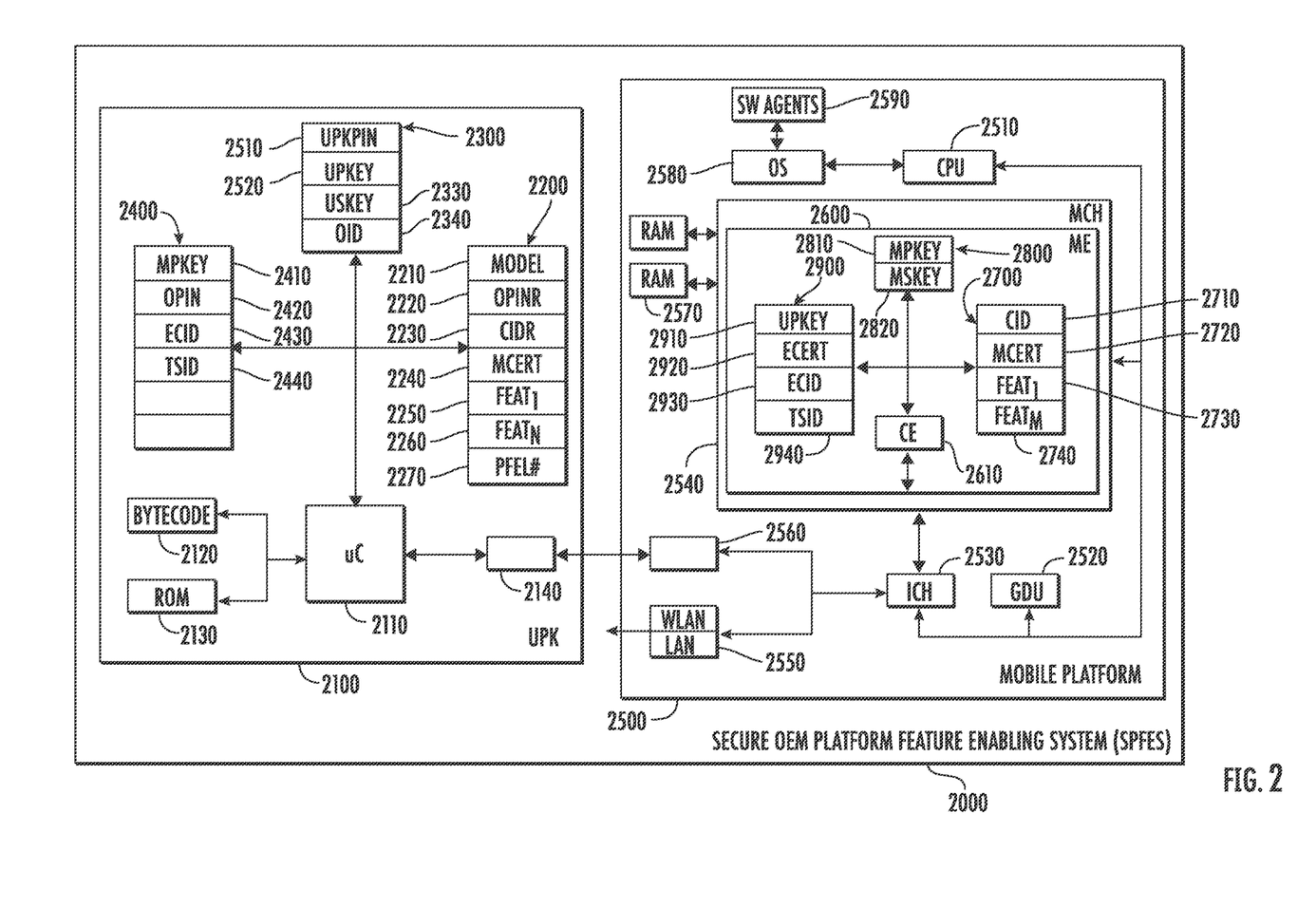
FIG. 2 is a block diagram illustrating a secure OEM platform feature enabling system, in accordance with another embodiment.

FIG. 2 illustrates an embodiment of secure OEM platform feature enabling system (SPFES) 2000, which may be similar in pertinent part to SPFES 1050 in FIG. 1. For example, FLM 1100, platform 1500, and FEE 1510, in FIG. 1 can be similar to UPK 2100, mobile platform 2500, and IEC 2600, respectively. Mobile platform 2500 may include CPU 2510, which may be interconnected with chipsets such as graphics/display processor 2520, input/output controller hub (ICH) 2530, or memory controller hub (MCH) 2540.

ICH 2530 can be configured to manage communications exchanged across I/O ports, including, networking port 2550 and communication port 2560. MCH 2540 can be configured to manage platform RAM 2570. Networking port 2550 may represent one or both of a wired LAN connection or a wireless LAN connection. In addition, communication port 2560 can be configured as a parallel or serial interface including, for example, a Universal Serial Bus (USB) port, which may facilitate communication with licensing module (UPK) 2100, which also can be configured with a USB port. Execution of program code, supplied to CPU 2510 by software agents 2590 may be controlled, at least in part, by platform operating system (OS) 2580.

In one embodiment, a selectable platform feature can be under the control of an integrated embedded controller (ME), which may reside in, or be coupled to, a particular platform chipset. More than one selectable platform feature may be available in a platform, remaining latent until activated, for example. In some embodiments, MCH 2540 can be configured with IEC 2600, having embedded microcontroller (CE) 2610 incorporated therein, and may provide mobile platform 2500 with one or more administrative services, such as configuration, provisioning, access control, or system service management.

In one embodiment, CE 2610 can be a secure microcontroller, which may include cryptographic apparatus, configured with to perform selected cryptographic engine functions, such as encryption, decryption, random number generation, and secure communications. CE 2610 also may include a processing apparatus configured to perform routine processing functions, including platform boot and the aforementioned one or more administrative services. Such cryptographic engine functions may be configured to support public key infrastructure (PKI)-types of cryptographic operations.

IEC 2600 also may be supported by, without limitation, a standard non-volatile (NV) memory 2700, a secure NV memory 2800, and RAM 2900, coupled to CE 2610. NV memory 2700 may be used for persistent storage of chipset and licensing data. Secure NV memory 2800 may be used to securely store sensitive data. In one embodiment, secure NV memory 2800 can be configured to allow access by CE 2610 but to substantially inhibit unauthorized access to data stored therein.

RAM 2900 may be used as a scratchpad, or to store data that have limited persistence. In the exemplary embodiment illustrated by IEC 2600, NV memory 2700 may store chipset identifier (CID) 2710, manufacturer's certificate (MCERT) 2720, or information regarding one or more selectable platform features (e.g., FEAT #1 2730 or FEAT #M 2740), which are capable of being enabled by IEC 2600. Similarly, secure NV memory 2800 may be used to store ME-Public Key (MPKEY) 2810 and ME-Private Key (MSKEY) 2820. Also, RAM 2900 can be used to temporarily store communicated data, including public encryption keys, received certificates and exemplars, and transaction session IDs, to name but a few.

A suitable embodiment of FLM 1100, which may be used with platform 2500 in FIG. 2, can be a communication key such as, a USB Provision Key (UPK) 2100. UPK 2100 may be configured as a smart card device, such as a USB Smart Card Token, in conjunction with one or more international standards including, without limitation, the ISO/IEC 7816 family of standards, or the ISO/IEC 14443 family of standards. One or more embodiments are disclosed herein as applicable to smart card devices, by way of example. It is noteworthy, however, that depending on implementation devices other than smart cards may be utilized instead or in conjunction with a smart card as provided below. UPK 2100 also may be configured in observance of other suitable authentication device standards. UPK 2100 can include embedded microcontroller (uC) 2110, configured with general processing apparatus and cryptographic apparatus, to respectively perform selected general processing and cryptographic operations.

An example of a cryptographic operation may include communicating with IEC 2600 using a preselected public-key cryptography technique. UPK 2100 also may include standard NV memory 2200, secure NV memory 2300, and volatile memory (RAM) 2400. NV memory 2200 can be used to store, without limitation, PFEL model 2210, a range of valid OEM operator personal identification numbers (OPINR) 2220, a range of chipset IDs for which UPK 2100 may be authorized (CIDR) 2230, a manufacturer certificate (MCERT), identifiers for at least one selectable platform feature that may be authorized to be enabled by UPK 2100 (e.g., FEAT #1 2250, FEAT #N 2260, or both), and the remaining count of PFEL available to UPK 2100 (PFEL COUNT 2270).

Similar to use in IEC 2600, secure NV memory 2300 in UPK 2100 may be used to store sensitive data including, for example, a UPK identification number (UPK PIN) 2310, UPK-Public Key (UPKEY) 2320, UPK-Private Key (USKEY) 2330, and OEM ID 2340. UPK 2100 also may use UPK RAM 2400 as a scratchpad, as well as to store data of limited persistence, such as a received public key (e.g., MPKEY 2410), an OEM operator PIN (OPIN) 2420, an encrypted chip ID (e.g., ECID 2430) and a secure transaction session ID (TSID) 2440. In selected embodiments of UPK 2100, UPKEY 2320 and USKEY 2330 may be generated during the manufacture of UPK 2100. In selected other embodiments, uC 2110 can be configured to dynamically generate and store UPKEY 2320 and USKEY 2330 in secure NV memory 2300.

In one embodiment, UPK 2100 can be configured to communicate with target platform 2500 by way of communication port 2140, for example. Communication port 2140 may be a secure USB port, configured to employ plug-in contact technique or to use a secure wireless proximity communication technique. A suitable contact technique can be described in Universal Serial Bus Revision 2.0 specification, as of Jul. 16, 2007, as promulgated by USB Implementers Forum, Inc., Beaverton, Oreg., USA. A suitable wireless proximity communication technique can be described in Wireless Universal Serial Bus Specification Revision 1.0, as of February 2007. In some embodiment, another coupling mechanism other than a USP port may be employed to allow UPK 2100 communicate with target platform 2500. The term coupling as used herein refers to a viable physical or logical connection over wired or wireless communication channels, wherein the connection once established allows UPK 2100 and platform 2500 communicate by way of data transfer over said connection.

Embedded uC 2110 may be a secure microcontroller, operating under the control of securely stored program code. A portion of program code targeted for uC 2110 may be stored in pre-programmed NV memory, such as ROM 2130.

Figure 3:
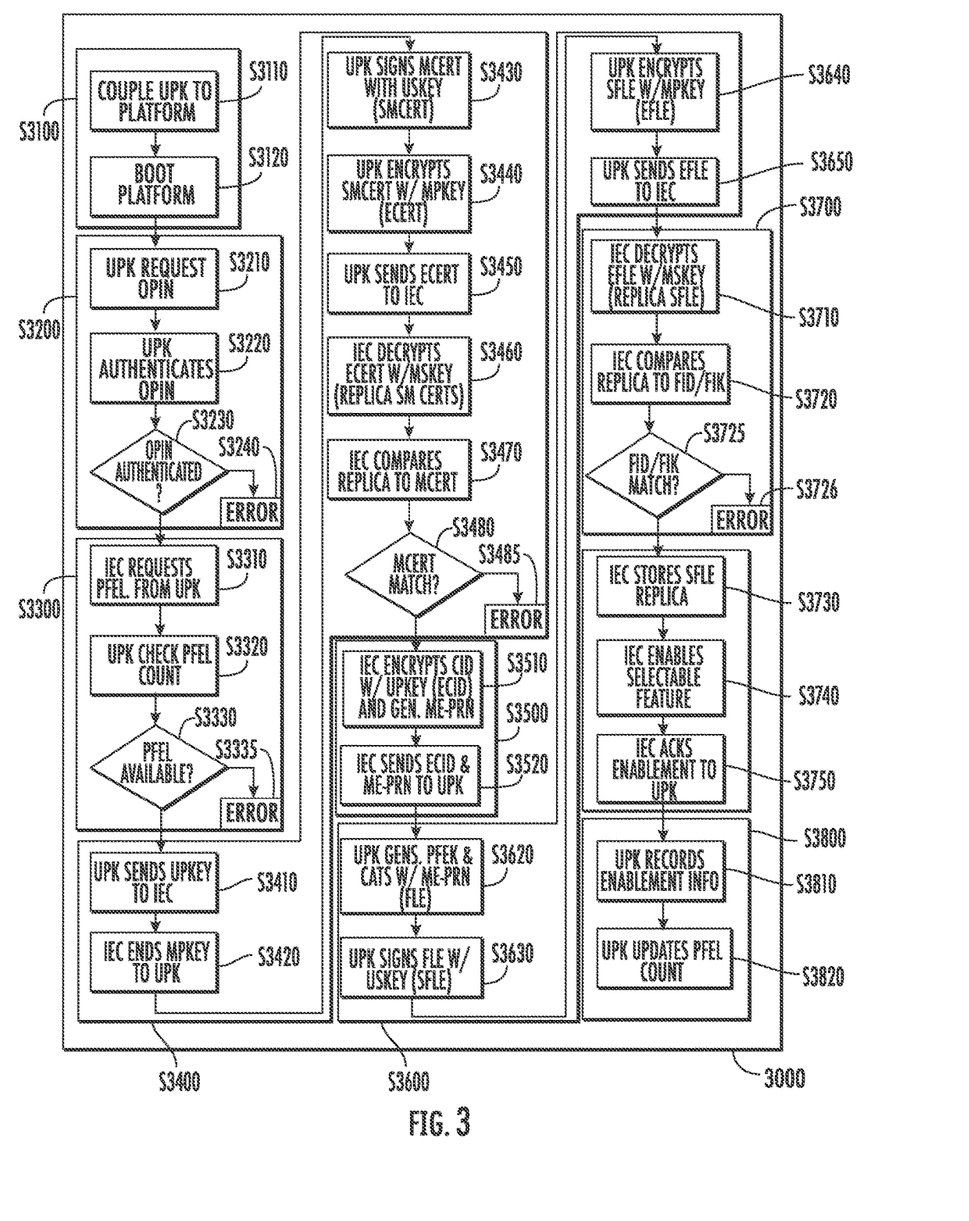
FIG. 3 is a flow diagram of a secure OEM platform feature enabling method, in accordance with one embodiment.

FIG. 3 illustrates a secure OEM platform feature enabling method 3000. Method 3000 may be applied to the exemplary operating environments illustrated in FIG. 1 or FIG. 2. Similarly, elements and functions of SPFES 2000, including UPK 2100, platform 2500, and IEC 2600, may be further appreciated when described within the context of method 3000. However, it is to be noted that SPFES 2000 may be used apart from method 3000, and vice versa. In general, method 3000 may implement a multi-mode security protocol, including multi-level entity authentication, physical access control, and logical access control, to securely enable a selectable platform feature. Method 3000 may enforce a type of physical access control by initiation through a boot operation of platform 2500.

In one embodiment, method 3000 also may employ a preselected certificate-based authentication protocol between UPK 2100 and IEC 2600, described below, to verify the authenticity of initiator and responder. In embodiments in which an OEM operator initiates method 3000 by coupling UPK 2100 to platform 2500, an OEM operator provides a form of "something known" type of authentication to system 2000. In selected embodiments of method 3000 in which the OEM operator is prompted to supply a personal PIN (e.g., OPIN 2420), the operator also provides "something physically carried" type of authentication to system 2000. Also, in certain selected embodiments of method 3000 in which UPK 2100 compares OEM operator OPIN 2420 to a predetermined range of allowed OPIN (e.g., OPINR 2220), OPINR 2220 may offer additional logical access control, in the form of, for example, an access control list or functional or structural equivalent thereof.

In addition, embodiments of UPK 2100 configured as a USB smart card token may provide physical access control features, in part, because the USB smart card token form factor and manner of use can provide a type of mandatory physical access control imposed by OEM 1010 on an operator using UPK 2100, and because the USB smart card token communication modality of UPK 2100 can provide access control by way of a physically constrained user interface. Furthermore, method 3000 may provide public-key encryption-based logical access control for PFEL data within system 2000 using public-key encryption techniques to provide secure, encrypted communications between authenticated parties UPK 2100 and IEC 2600. Moreover, method 3000 may provide layered logical access control in which UPK 2100 and IEC 2600 exchange a dynamically-established secret session key, which may be used to create a secure communication channel between UPK 2100 and IEC 2600 during the transaction in which a PFEL is issued by UPK 2100 to IEC 2600.

In accordance with one embodiment, to begin secure OEM platform feature enabling method 3000, it may be desirable to initialize platform security (S3100), by coupling UPK 2100 to platform 2500 (S3110), for example, using communication port connections 2560. Whether using wired or wireless coupling, UPK 2100 can provide a form of physical access control to platform feature licensing module UPK 2100, for example, to assist OEM 1010 in managing authorized platform configuration and provisioning. For example, OEM 1010 may permit only properly vetted and entrusted OEM technicians to gain physical control of UPK 2100, and thus, configure platforms 1500, 2500 in accordance with licensing policies established between OEM 1010 and MFG 1020.

Continuing with method 3000, an OEM technician may boot platform 2500 (S3120), in an attempt to deter circumvention of platform 2500 feature licensing mechanisms. IEC 2600 may be activated in firmware during the boot operation into the predetermined platform operating system 2580, and be configured to await a request for enabling a selectable platform feature. In some embodiments, it may be desirable to authenticate the identity of the OEM operator (S3200), for example, by UPK 2100. In such embodiments, UPK 2100 may initiate operator authentication by requesting an operator PIN (S3210) from the OEM worker via platform 2500, by storing OPIN 2420 in UPK RAM 2400, and by authenticating the value of OPIN 2420 (S3220), to a stored range of valid operator PINs (e.g., OPINR 2220). OPINR may be stored in UPK NV memory 2200. It is determined if OPIN is authenticated (S3250). If not, then first transaction error (S3240) can be perceivably issued, for example, on a display coupled to platform 2500. If OPIN authentication is successful platform 2500 can be rendered operable for feature enablement, as provided in further detail below.

Method 3000 can proceed by determining whether UPK 2100 is capable of issuing a valid program feature enabling license (S3300), in which the OEM operator causes IEC 2600, via platform 2500, to request from UPK 2100 (S3310). In one embodiment, platform feature enabling license (PFEL) corresponds to a selectable platform feature provided by a predetermined platform chipset. IEC 2600 may be a platform chipset configured to provide one or more selected platform features. IEC 2600 may be also configured to control one or more selected platform features provided by a platform chipset apart from IEC 2600. Responsive to a license request by IEC 2600, UPK 2100 may check stored PFEL count 2700 (S3320) to determine whether a license may be available for issue to IEC 2600. Depending on implementation, PFEL count 2700 can correspond to a predetermined PFEL model, for example, a pre-pay PFEL model or a post-pay PFEL model, determined by previous agreement between OEM 1010 and MFG 1020.

UPK 2100 may be configured to enable a selectable platform feature on more than one type of platform chipset, or one more than one type of platform 2500. For example, an unfinished platform 2500 may include a first selectable platform feature (represented by FEAT #1 2730) which, when licensed, may be enabled in MCH 2540 by IEC 2600; and a second selectable platform feature (represented by FEAT #M 2740), which may be enabled in GDU 2520 or, perhaps, ICH 2530, under control of IEC 2600. Thus, UPK 2100 may provide for plural PFEL counts corresponding to respective selectable platform features, in turn corresponding to respective platform chipsets having latent selectable platform features that are capable of being enabled by UPK 2100. Thus, in response to a request by IEC 2600, UPK 2100 determines whether a PFEL is available (S3330). If PFEL is not available for the requested selectable platform feature, then a second transaction error is perceivably issued (S3335).

If PFEL is available, UPK 2100 may initiate a preselected authentication dialog with IEC 2600 (S3400), in which UPK 2100 initiates by retrieving the value of an UP-Public Key from secure UPK NV storage 2320, and sending UPKEY 2320 to IEC 2600 (S3410). When UPKEY 2320 is received, IEC 2600 can respond by retrieving a value of ME-Public Key from secure NV storage 2810, and sending MPKEY 2810 to UPK 2100 (S3420). Exchange of public keys can facilitate certificate-based authentication. UPK 2100 may facilitate certificate-based authentication by retrieving a UPK copy of a manufacturer certificate stored, for example, in UPK NV memory 2240 (UMCERT). UPK 2100 also may sign UMCERT with UPK-Private Key (USKEY), producing a signed UPK MCERT (SUMCERT) (S3430).

In one embodiment, SUMCERT may be encrypting with MPKEY 2820 (S3440), and UPK 2100 transmits to IEC 2600 an encrypted, signed manufacturer's certificate (ECERT) (S3450), by which IEC 2600 may satisfactorily authenticate the identity of UPK 2100. IEC 2600 may receive ECERT from UPK 2100, and store it in IEC RAM 2920. IEC 2600 may decrypt ECERT using MSKEY 2820 (S3460), thereby extracting SUMCERT signed by UPK and, with knowledge of UPKEY stored in IEC RAM 2910, extracting a copy of UMCERT 2240. IEC 2600 also can store an IEC copy of a manufacturer's certificate (MMCERT), for example, in IEC NV memory 2720. By comparing UMCERT with MMCERT (S3470), IEC 2600 can authenticate the identity of UPK 2100 as a proper source of PFE licenses by determining if there is a match (S3480). If UMCERT does not compare favorably with MMCERT, then two-way authentication may be unsuccessful and a third transaction error is perceivably issued (S3485).

In the event of authentication failure, it may be desirable for IEC 2600 to successfully complete a preselected authentication dialog, in furtherance of a certificate-based authentication, for example, by performing a predetermined number of reattempted authentications. Following an authentication failure, it may be useful for IEC 2600 to offer ME-Public Key 2810 to UPK 2100, for example, resuming dialog S3400 at operation S3420. Also, after exhaustion of the predetermined number of re-attempted authentications, it may be desirable for IEC 2600 to configure platform 2500 to be unresponsive to future attempts to enable selectable platform features, pending intervention of a security bypass operation, which may be mediated by an original UPK 2100, by a different UPK 2100, by platform 2500, or by a cooperative combination thereof.

Upon successful authentication of UPK 2100, method 3000 may continue by IEC 2600 providing UPK 2100 with an identifier (S3500), such as CID 2710, corresponding to the chipset for which the selectable platform feature enabling is requested, which CID may be stored in IEC NV memory 2700. IEC 2600 may employ CE 2610 to encrypt CID 2710, for example, using the stored value in UPKEY 2910, producing ECID 2930 (S3510). In addition, CE 2610 may generate a pseudorandom number (ME-PRN), which may be used as a transaction session ID (TSID) 2940 to establish secure communication between IEC 2600 and UPK 2100. To continue a PFEL request, IEC 2600 may transmit ECID 2930 and ME-PRN (TSID) 2940 to UPK 2100 (S3520), which may be at least temporarily stored in ECID 2340 and TSID 2440 of UPK 2100. In response to IEC 2600, UPK 2100 can provision a PFEL to now-authenticated IEC 2600 (S3600), after establishing a secure communication link using TSID 2440. UPK 2100 can provision a PFEL, or generate a platform feature enabling key (PFEK) and may concatenate thereto a shared secret value, such as TSID 2440, forming a feature license enabling certificate (FLE), that may be a representative of a corresponding PFEL (S3620). UPK 2100 also may sign FLE using UPK-Private Key 2340, forming a signed FLE (SFLE) (S3630).

In one embodiment, SFLEC may be representative of an authenticated PFEL for a selectable platform feature license requested by IEC 2600. In addition, using a PKI technique, UPK uC 2110 can encrypt SFLE using stored ME-Public Key 2410, producing an encrypted licensing certificate (EFLE) (S3640). IEC 2600 may receive EFLE from UPK 2100, and temporarily store EFLE in IEC RAM 2950 (S3650). In response to receiving EFLE from UPK 2100, IEC 2600 can be caused to enable the selectable platform feature represented by EFLE 2950 (S3700). Prior to enabling a requested selectable platform feature, IEC 2600 may employ CE 2610 to decrypt EFLE 2950 with MSKEY 2820 (S3710), wherein the decrypted ELFE corresponds to the signed license certificate SLFE generated by the UPK 2100. Also, IEC 2600 may compare the received SFLE with one or both of FID or FIK, which may be stored in IEC NV memory 2730 or 2740 (S3720).

It is determined if the extracted SFLE properly compare to one of the FID or FIK (S3725). If not, a fourth transaction error may be perceivably generated (S3726). In general, FID/FIK corresponds to a latent feature which can be enabled by IEC 2600. A failed comparison may indicate, for example, an attempted breach of security, or a faulty communication between UPK 2100 and IEC 2600. Otherwise, if the extracted SFLE does properly compare with one of the FID or FIK, IEC 2600 can store SFLE in secure NV memory 2800, for example, in SFLE 2830 (S3730). SFLE 2830 can be retained in IEC 2600 and can be indicative of at least one PFEL, corresponding to at least one selectable platform feature, enabled in finished platform 2500 using, for example, a secure OEM platform feature enabling method, such as method 3000.

In response to receiving an authenticated PFEL, IEC 2600 can be configured to enable a corresponding requested selectable platform feature (S3740). Conveniently, the stored SFLE bears the Private-Key signature of the UPK. This process may facilitate verification of platform 2500 configuration prior to shipment by the OEM, as well as to expedite later feature and asset management, including asset inventory analysis, security audit, or piracy mitigation. It may be desirable for IEC 2600 to confirm to UPK 2100, enablement of a requested selectable platform feature, for example, by transmitting an enablement acknowledgement to UPK 2100 (S3750). IEC 2600 may affect acknowledgement simply by echoing back EFLE 2950 representing the licensed enabled platform feature to UPK 2100. Alternatively, IEC 2600 can generate and transmit a predetermined enablement acknowledgement to UPK 2100. UPK 2100 can respond to an enablement acknowledgement received from IEC 2600 by causing PFEL count 2270 to be updated in accordance with PFEL model 2210 associated with the UPK 2100. For example, where PFEL model 2210 corresponds to a pre-pay model, UPK 2100 may decrement PFEL count 2270, or where PFEL model 2210 corresponds to a post-pay model, UPK 2100 may increment PFEL count 2270.

UPK 2100, in one embodiment, may respond to acknowledgement from IEC by performing PFEL administrative tasks (S3800). The performance of such administrative tasks may comprise recording the respective enablement information (S3810). The enablement information may include, for example, issued PFEL-related information, the CID to which a PFEL was issued, an FID/FIK for one or more licensed features enabled on the licensed CID, the OID, OPIN, or other suitable indicia of a platform feature enabling license transaction. UPK 2100 may be configured to retain such information, for example, in anticipation of subsequent upload of data stored on UPK 2100 for transmission by OEM 1010 to MFG 1020. Data upload may be performed in conjunction with license tracking, billing, and analysis, for example, by subsystems 1210, 1220, 1230, or 1240, of manufacturer feature provisioning system 1200. UPK 2100 may be configured to be updated, for example, by communicating with manufacturer feature provisioning system 1200 (S3820). It is desirable that communication between UPK 2100 and system 1200 be accomplished using secure communications, for example, by being coupled over VPN connection to manufacturer feature provisioning system 1200. Alternatively, UPK 2100 may be physically transported back to manufacturer 1020, for example, by courier.

It should be understood that the logic code, programs, modules, processes, methods and the order in which the respective steps of each method are performed are purely exemplary. Depending on implementation, the steps may be performed in any order or in parallel, unless indicated otherwise in the present disclosure. Further, the logic code is not related, or limited to any particular programming language, and may comprise of one or more modules that execute on one or more processors in a distributed, non-distributed or multiprocessing environment. Therefore, it also should be understood that the invention can be practiced with modification and alteration within the spirit and scope of the appended claims. The description is not intended to be exhaustive or to limit the invention to the precise form disclosed. These and various other adaptations and combinations of the embodiments disclosed are within the scope of the invention and are further defined by the claims and their full scope of equivalents.

What is claimed is:

1. A platform feature licensing device (PFLD) comprising:
   a non-volatile memory to store a platform feature enabling license (PFEL) corresponding to a selectable platform feature of a platform in an unfinished state and a PFEL count, wherein the selectable platform feature is to comprise an existing platform feature implemented in circuitry of the platform and the PFEL is operative to enable the circuitry to provide the selectable platform feature;
a communications port for communicating with the platform; and
a microcontroller utilized by an original equipment manufacturer (OEM) to modify functionality of an unfinished platform to meet a functional condition for a finished platform, the microcontroller configured to store the PFEL and the PFEL count in the non-volatile memory, to detect coupling of the communications port to the platform in the unfinished state, to receive via the communications port, a request, from an integrated embedded controller (IEC) of the platform, to determine whether the microcontroller is authorized to transmit one of the PFEL to the platform, to check the PFEL count based on the coupling of the communications port to the platform and based on the request to determine whether the microcontroller is authorized to transmit one of the PFEL to the platform, to transmit the PFEL to the platform by way of the communications port based on a determination that the microcontroller is authorized to transmit one of the PFEL to the platform and based on the coupling of the of the communications port to the platform to trigger the IEC to enable the circuitry to provide the selectable platform feature, wherein enabling the circuitry of the platform to provide the selectable platform feature with the microcontroller utilized by the OEM converts the platform from the unfinished state to a finished state, and to update the PFEL count within the non-volatile memory to indicate a reduction in number of platforms to which the microcontroller is authorized to transmit the PFEL, wherein the PFLD is a device external to the platform.

2. The PFLD of claim 1, wherein the microcontroller is configured to transmit the PFEL to the platform via the communications port upon mutual authentication of the PFLD and the platform by the microcontroller in cooperation with the IEC through the communications port.

3. The PFLD of claim 2, wherein the microcontroller is configured to perform the mutual authentication with the IEC using a pre-selected public key pair cryptography technique.

4. The PFLD of claim 1, wherein the communications port implements universal serial bus (USB) and the PFLD is one of a USB provision key or a USB smart card.

5. A computer-implemented method, comprising:
receiving, by a microcontroller of a platform feature licensing device (PFLD) and at a communications port of the PFLD, from a manufacturer feature provisioning system to which the microcontroller is coupled via the communications port, a platform feature enabling license (PFEL) corresponding to a selectable platform feature and authorization for the microcontroller to transmit the PFEL up to a predetermined number of platforms, the microcontroller utilized by an original equipment manufacturer (OEM) to modify functionality of an unfinished platform to meet a functional condition for a finished platform;
storing, by the microcontroller, the PFEL and a PFEL count equal to the predetermined number in a non-volatile memory of the PFLD that is accessible to the microcontroller and not accessible to the communications port, the PFEL count indicating a number of platforms to which the microcontroller is authorized to transmit the PFEL;
detecting, by the microcontroller, coupling of the communications port to a platform in an unfinished state;
receiving, via the communications port, a request, from an integrated embedded controller (IEC) of the platform, to determine whether the microcontroller is authorized to transmit one of the PFEL to the platform;
checking, by the microcontroller based on the request and based on the coupling of the communications port to the platform, the PFEL count to determine, by the microcontroller, whether the PFLD is authorized to transmit one of the PFEL to the platform;
transmitting, by the microcontroller, the PFEL to the platform by way of the communications port based on a determination that the PFLD is authorized to transmit one of the PFEL to the platform and based on the coupling of the communications port to the platform, transmission of the PFEL to trigger the IEC to enable circuitry of the platform to provide the selectable platform feature, wherein enabling the circuitry of the platform to provide the selectable platform feature with the microcontroller utilized by the OEM converts the platform from the unfinished state to a finished state, and wherein the selectable platform feature is to comprise an existing platform feature implemented in the circuitry of the platform; and
updating the PFEL count, by the microcontroller, within the non-volatile memory to indicate a reduction in the number of platforms to which the microcontroller is authorized to transmit the PFEL as a result of the transmission of the PFEL to the platform.

6. The computer-implemented method of claim 5, comprising:
performing, by the microcontroller in cooperation with the IEC through the communications port, mutual authentication of the PFLD and the platform; and
transmitting, by the microcontroller and via the communications port, the PFEL to the platform upon the mutual authentication.

7. The computer-implemented method of claim 6, comprising:
performing the mutual authentication using a pre-selected public key pair cryptography technique.

8. The computer-implemented method of claim 5, wherein the communications port implements universal serial bus (USB) and the PFLD is one of a USB provision key or a USB smart card.

9. An article comprising a non-transitory computer-readable storage medium containing instructions that if executed by a processor enable a system to:
store a platform feature enabling license (PFEL) corresponding to a selectable platform feature of a platform in an unfinished state and a PFEL count in a first non-volatile memory of a platform feature licensing device (PFLD), wherein the selectable platform feature is to comprise an existing platform feature implemented in circuitry of the platform, the PFLD utilized by an original equipment manufacturer (OEM) to modify functionality of an unfinished platform to meet a functional condition for a finished platform;
detect coupling of a communications port of the PFLD to the platform in the unfinished state;
receive, via the communications port, a request, from an integrated embedded controller (IEC) of the platform, to determine whether the microcontroller is authorized to transmit one of the PFEL to the platform;
check the PFEL count based on the coupling of the communications port to the platform and based on the request to determine whether the PFLD is authorized to transmit one of the PFEL to the platform;

transmit the PFEL to the platform by way of the communications port based on a determination that the PFLD is authorized to transmit one of the PFEL to the platform and based on the coupling of the communications port to the platform, transmission of the PFEL to trigger the platform to enable the circuitry to provide the selectable platform feature, wherein enabling the circuitry to provide the selectable platform feature with the PFLD utilized by the OEM converts the platform from the unfinished state to a finished state; and update the PFEL count within the non-volatile memory to indicate a reduction in number of platforms to which the PFLD is authorized to transmit the PFEL, wherein the PFLD is to comprise device external to the platform.

10. The article of claim 9, comprising instructions that if executed enable the system to:

perform, in cooperation with the platform, mutual authentication of the PFLD and the platform; and transmit the PFEL to the platform via the communications port upon the mutual authentication.

11. The article of claim 10, comprising instructions that if executed enable the system to:

perform the mutual authentication using a pre-selected public key pair cryptography technique.

12. The article of claim 9, wherein the communications port implements universal serial bus (USB) and the PFLD is one of a universal serial bus (USB) provision key or a USB smart card.

13. The PFLD of claim 1, comprising the platform, wherein the platform is to comprise a processor component and a chipset coupled to the processor component, and wherein the chipset is to comprise the circuitry and is to enable access to the selectable platform feature by the processor component in response to authorization of the selectable platform feature within the platform.

14. The computer-implemented method of claim 5, comprising enabling, with a chipset of the platform, access to the selectable platform feature by a processor component of the platform in response to authorization of the selectable platform feature within the platform.

15. The article of claim 9, comprising instructions that if executed enable the system to:

enable access to the selectable platform feature by a processor component in response to authorization of the selectable platform feature within the platform.

* * * * *